Jan. 14, 1969  D. G. SIPPEL  3,421,385
MOVABLE STEERING COLUMN HAVING VERTICAL TILT
ADJUSTMENT AND SWING-AWAY POSITION
Filed Oct. 22, 1965
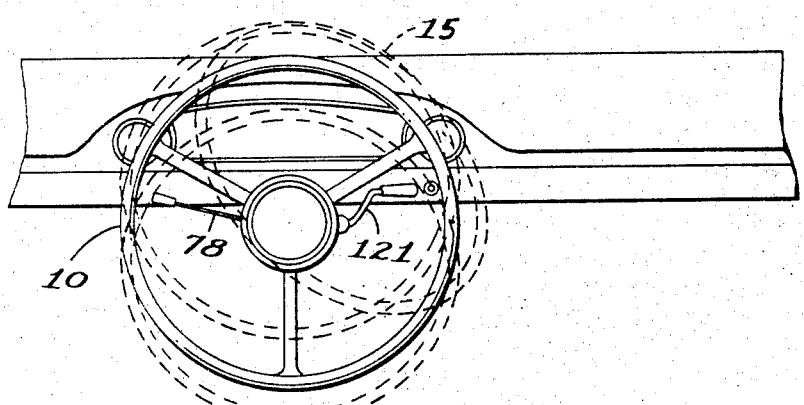
FIG.1
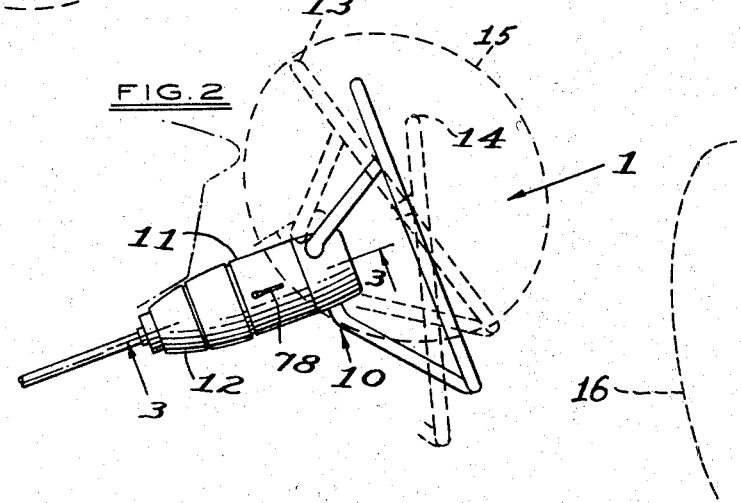
FIG.2
FIG.12
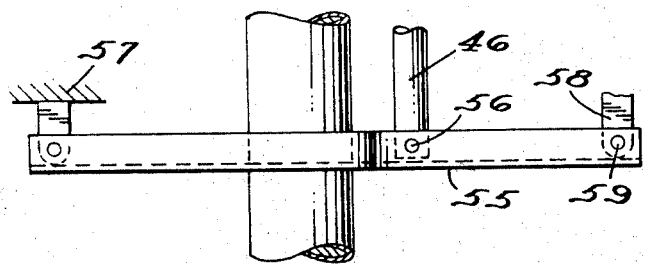
DONALD G. SIPPEL
INVENTOR.
BY John R. Faulkner
Keith L. Zerschling
ATTORNEYS

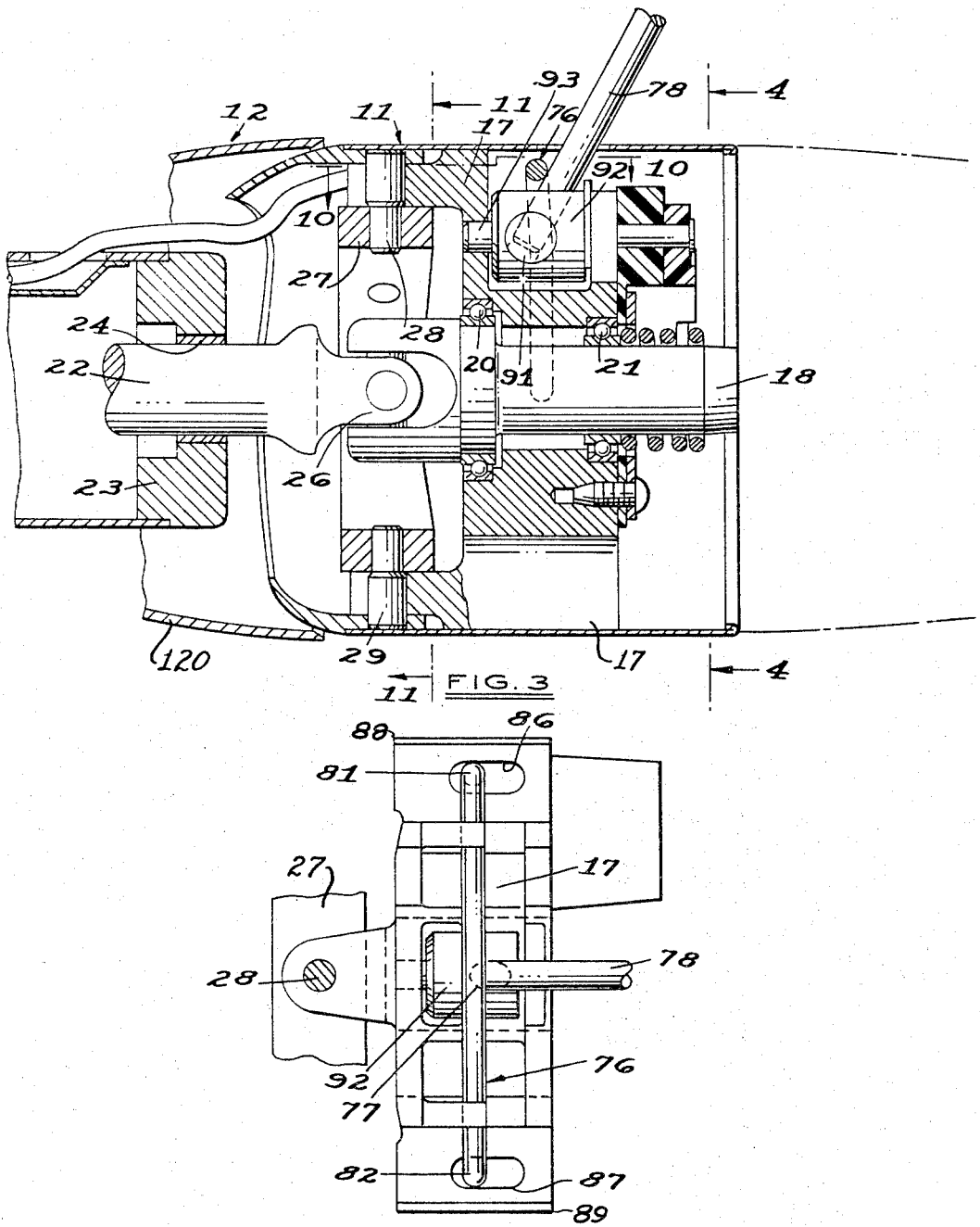

DONALD G. SIPPEL
INVENTOR.

BY John R. Faulkner
Keith L. Zerschling
ATTORNEYS

United States Patent Office 3,421,385
Patented Jan. 14, 1969

3,421,385
MOVABLE STEERING COLUMN HAVING VERTICAL TILT ADJUSTMENT AND SWING-AWAY POSITION
Donald G. Sippel, Windsor, Ontario, Canada, assignor to Ford Motor Company, Dearborn, Mich., a corporation of Delaware
Filed Oct. 22, 1965, Ser. No. 501,595
U.S. Cl. 74—493     12 Claims
Int. Cl. B62d 1/18; B60k 27/00

ABSTRACT OF THE DISCLOSURE

A jointed steering column for a vehicle having means permitting the steering wheel to tilt vertically for adjustment of its driving position and to swing laterally and vertically for access to the driver's seat. A cam stop device locates the wheel in a set swing-away position irrespective of the vertically adjusted position of the wheel, and a single spring that urges the wheel toward both its tilt-up and swing-away positions.

---

This invention relates to a steering column mechanism for an automotive vehicle and more particularly to such a steering column mechanism in which the upper portion of the steering column and steering wheel may be tiltably adjusted into a number of operable driving positions and may also be swung away, preferably upwardly and inwardly of the vehicle body, to permit easy egress from and access to the driver's seat of the vehicle.

In the present day automotive vehicles that have a low silhouette and in which the vehicle driver and other occupants sit low in the vehicle, the steering column that carries the steering wheel ordinarily projects into the passenger compartment at an angle slightly above the horizontal and the steering wheel ordinarily is positioned in close proximity to the front seat of the vehicle that supports the vehicle driver. In these circumstances there is need not only for a steering wheel that can be adjusted into a number of different operable driving positions to provide the optimum driving position for various drivers having different physical characteristics, but there is also a need to provide some means for shifting the vehicle steering wheel to a remote position when the driver of the vehicle leaves and re-enters the driver's seat.

The present invention fulfills the above described needs by providing a steering wheel and upper steering column section that can be adjusted into a plurality of different driving positions preferably about a substantially horizontal axis that extends transversely to the axis of the steering column and steering shaft and that can also be shifted or swung away about another axis positioned transversely with respect to the axis of the steering column and steering wheel shaft and at a substantial angle to the first mentioned substantially horizontal axis. This second axis is preferably inclined so that the steering column may be swung upwardly and inwardly with respect to the operable driving positions of the steering wheel and upwardly and inwardly in the vehicle body. This places the steering wheel in a remote position to provide easy egress from an access to the driver's seat of the vehicle.

In the invention this is accomplished by a two section steering column having an upper and lower section, and by a steering shaft divided into an upper and lower section coupled by a universal joint. An intermediate ring or gimbal member joins the lower and upper sections of the steering column. This intermediate ring or gimbal member is pivotally mounted to the upper section about an axis that extends transversely to the axis of the steering column and shaft and that is substantially horizontal. The intermediate gimbal or ring member is also pivotally mounted on the lower steering column section on an axis that extends transversely with respect to the steering column and steering shaft and that is inclined with respect to the horizontal, preferably at an angle of 45° with respect to the horizontal and the first described axis.

The upper steering column section that carries the steering wheel is releasably latched to the intermediate gimbal member by a multiple position latch mechanism that permits the adjustment of the steering wheel and upper steering column section about this horizontal axis into a number of different operable driving positions. This latch is spring urged into engagement and preferably the turn signal lever is employed to release this latch when the turn signal lever is depressed in a plane substantially perpendicular to its plane of operation when it is performing its turn signal switching function.

The intermediate ring or gimbal member is also releasably latched to the lower section of the steering column, preferably by means of single position pin actuated latch mechanism so that the upper section of the steering column and the steering wheel may be shifted or swung away into a remote position when this latch is released. The pivotal axis of the pivotal means previously described for coupling the lower steering column section to the intermediate ring or gimbal member is positioned at an angle, and as previously stated preferably 45°, with respect to the horizontal to permit the steering wheel and upper steering column section to be swung away into a position upwardly and inwardly in the vehicle body.

When the latch mechanism, that releasably latches the intermediate ring or gimbal member to the lower steering column section, is released and the upper steering column section and steering wheel is swung away into its remote position, the relative position of the upper steering section and the intermediate ring or gimbal member is undisturbed, since the multiple position latch mechanism that latches these two components together is not operated at that time. As a result, when the steering wheel and upper steering column section are returned toward the driving positions, the steering wheel and upper steering column section will automatically be returned to the previously selected driving position. The steering column mechanism of the present invention, therefore, has a built-in memory that will automatically provide for the return of the steering wheel to the previously selected steering position, after the upper steering column section and steering wheel have been swung away to a remote position and returned to the driving positions.

The invention also provides a single spring means intercoupling the lower steering column section and the upper steering column section, and this single spring means automatically moves the upper steering column section and the steering wheel into the remote or swing away position when the latch means intercoupling the intermediate ring or gimbal member and the lower steering column mechanism is released. This spring means also biases or urges the upper steering column section and the steering wheel into the uppermost of the operative driving position when the multiple position latch means intercoupling the upper steering section and the intermediate ring or gimbal member is released.

The present invention also includes a stop member formed on the lower steering column section housing and a generated cam surface on the upper steering column section housing that cooperate to provide a stop means to limit the movement of the steering wheel as it is swung away into its swing away position. The cam surface generated on the upper steering column section housing is generated so that it provides for the same swing away position with respect to the vehicle instrument panel irrespective of the operable driving position of the steering wheel and upper steering column section housing.

There is also provided in the invention a means for swinging the transmission selector lever with the upper steering column section housing and the steering wheel when these two components are moved into the swing away position. This prevents any interference between the transmission selector lever and the upper steering column section housing during this operation.

An object of the present invention is the provision of a steering column mechanism for an automotive vehicle that permits adjustment of the steering wheel into a number of different operable driving positions, and also permits the steering wheel to be swung away into a remote position that is preferably upwardly and inwardly with respect to the driving positions and with respect to the vehicle body.

A further object of the invention is the provision of a steering column mechanism for an automotive vehicle in which the steering wheel, and an upper steering column section supporting the steering wheel, may be adjusted or tilted about a substantially horizontal axis to provide a plurality of different operable driving positions and may be swung away inwardly of the automotive vehicle body to a remote position to facilitate easy egress from and access to the driver's seat of the automotive vehicle.

A further object of the invention is the provision of a steering column mechanism in an automotive vehicle in which the steering wheel and the upper steering column section supporting it may be adjusted about a horizontal axis into a plurality of different operable driving positions and may be swung away toward the center of the vehicle about an axis inclined to the horizontal and in which the steering wheel and steering column will be automatically returned to a previously selected driving position when the steering wheel and upper steering column section are swung away to the remote position and then are returned to the operable driving positions from this remote position.

Another object of the invention is the provision of a tiltable and swing away steering wheel and column in which an upper steering column section is pivotally mounted upon an intermediate ring or gimbal member on a substantially horizontal axis extending transversely with respect to the steering column and steering shaft axis, and in which the intermediate ring or gimbal member is pivotally mounted on a fixed lower steering column section on an axis extending transversely with respect to the steering column and steering shaft axis and at an angle so positioned with respect to the horizontal that when a releasable latch means that latches the lower steering column to the intermediate ring or gimbal member is released, the upper steering column section will be capable of movement into a swing away position located upwardly and inwardly in the vehicle body with respect to the operable driving positions of the steering wheel.

Still a further object of the invention is the provision of a tilt and swing away steering column in which an intermediate ring or gimbal member pivotally mounts the upper steering column section carrying the steering wheel about a substantially horizontal axis disposed substantially transversely to the axis of the steering shaft and the steering column, and in which a releasable multiple position latch means that releasably latches the upper steering column section to the intermediate ring or gimbal member is operable by the movement of the turn signal switch lever in a plane normal to its plane of operation when it functions to switch the turn signals.

Another object of the invention is the provision of a stop means in a tilt and swing away steering column for positioning the steering wheel and the upper steering column section in the same swing away position irrespective of the adjustable operative driving position of the steering wheel and upper steering column section.

Yet another object of the invention is the provision of a tilt and swing away steering wheel and upper steering column section in which the transmission selector lever may be swung with the upper steering column section and steering wheel when these two components are moved to the swing away position thereby preventing any interference between the transmission selector lever and the upper steering column section.

Further objects and attendant advantages of the invention may be more readily realized when the specification is considered in connection with the attached drawings in which:

FIGURE 1 is a front elevational view of the steering wheel of the present invention mounted in a vehicle body in which the solid lines show the steering wheel in one of its operable driving positions and the dashed lines show the steering wheel in its swing away position.

FIGURE 2 is a side elevational view of the steering mechanism shown in FIGURE 1 which shows the steering wheel, and the upper steering column section supporting it, in one of its operative driving positions (solid lines) and in which the dashed lines show the steering wheel and upper steering column section in other of its operative driving positions and in its swing away position.

FIGURE 3 is a sectional view partially in elevation of the upper steering column section taken along the lines 3—3 of FIGURE 2.

FIGURE 10 is an elevational view partially in section taken along the lines 10—10 of FIGURE 3.

FIGURE 12 is an elevational view taken along the lines and in the direction of the arrows 12—12 of FIGURE 7 and FIGURE 13 is an elevational view of the notched member that cooperates with the transmission selector lever.

Figure 4:
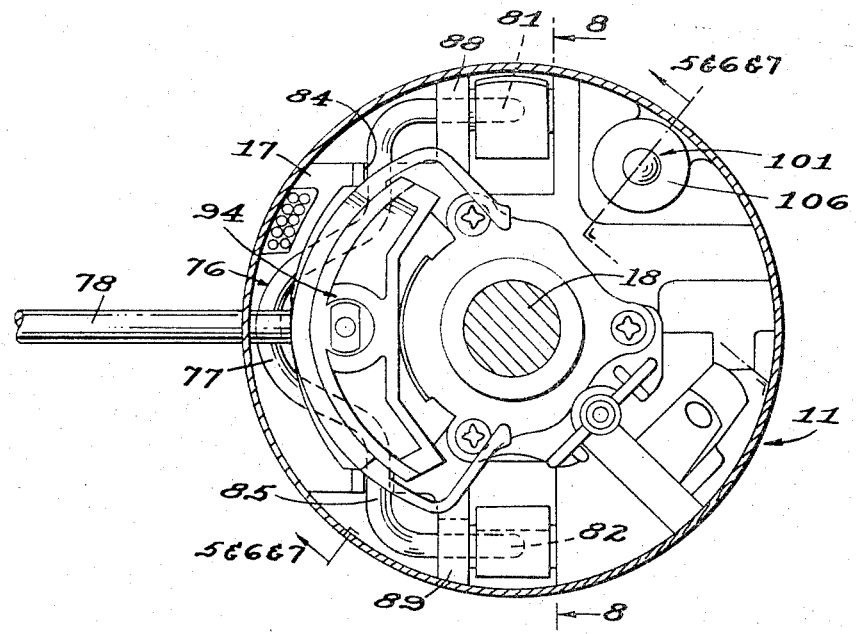
FIGURE 4 is a sectional view partially in elevation taken along the lines 4—4 of FIGURE 3.

Referring now to the drawings in which like reference numerals designated like parts throughout the several views thereof there is shown in FIGURES 1 and 2 a steering wheel 10 that is rotatably mounted in an upper steering column section 11. The steering wheel 10 and the upper steering column section 11 are mounted on a fixed lower steering column section 12 by means to be described subsequently that permit adjustment of the steering wheel 10 and upper steering column section 11 into a plurality of operable driving positions. One of these positions is shown by the steering wheel in solid lines of FIGURE 2, while other operable steering or driving positions are designated by the steering wheel shown in the dotted lines in FIGURE 2 as at 13 and 14. This means also permits the steering wheel 10 and the upper steering column section 11 to be swung away into a remote position for easy access and egress to the driver's seat 16 of the vehicle. The swing away position is accomplished by swinging the steering wheel 10 and the upper steering column section 11 about a different axis than the axis about which they are tilted when they are moved into different operable driving positions. This swing away position is prefereably upwardly and inwardly in the vehicle body with respect to the operable driving positions as shown at 15 by the dotted lines in FIGURES 1 and 2.

Figure 8:
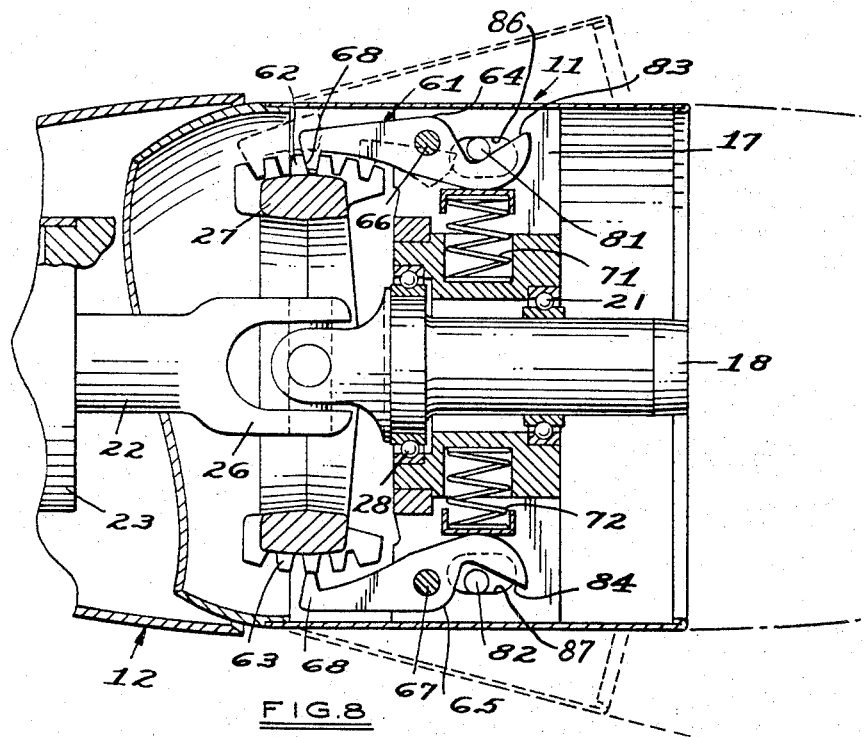
FIGURE 8 is a sectional view partially in elevation taken along the lines 8—8 of FIGURE 4 and showing the multiple releasable latch mechanism for latching the upper steering column section to the intermediate ring or gimbal member.

Referring now to FIGURES 3 and 8, it can be seen that the upper steering column section 11 comprises an upper steering shaft housing 17 that rotatably supports an upper steering shaft section 18 by means of bearings 20 and 21. The upper steering shaft section 18 is of course, nonrotatably affixed to the steering wheel 10.

A lower steering shaft section 22 is rotatably supported in a lower steering shaft housing 23 that forms a portion of the lower steering column section 12 by means of suitable bearings, one of which is shown at 24. The upper steering shaft 18 and the lower steering shaft section 22 are joined by a universal joint 26, and as previously pointed out, the lower steering shaft section 12 fixed within the vehicle body by any conventional means (not shown).

The upper steering shaft section housing 17 is pivotally supported on an intermediate ring or gimbal 27 by a pair of pins 28 and 29 on an axis that is transverse with respect to the axis of the lower steering shaft section 22 and the upper steering shaft section 18, and that is positioned substantially horizontally within the automotive vehicle body.

The intermediate ring or gimbal member 27 is pivotally supported on the lower steering shaft section housing 23 of the lower steering column section 12 about an axis that is disposed transversely with respect to the axis of the lower steering shaft section 22 and the upper steering shaft section 18 and that is also disposed at an angle with respect to the substantially horizontal pivotal axis about which the upper steering shaft section housing 17 is pivotally mounted on the intermediate ring or gimbal member 27. This axis is preferably disposed at an angle of 45° with respect to this substantially horizontal axis. This is accomplished by means of a pair of upstanding ears 32 and 33 on the lower steering shaft section housing 23, as can most readily be seen by reference to FIGURES 5, 6, 7 and 11, and by a pair of pins 34 and 35 that pass through the upstanding ears 32 and 33 and the opposing portions 37 and 38 of the intermediate ring or gimbal member 27 as can best be seen by reference to FIGURE 11.

Figure 9:
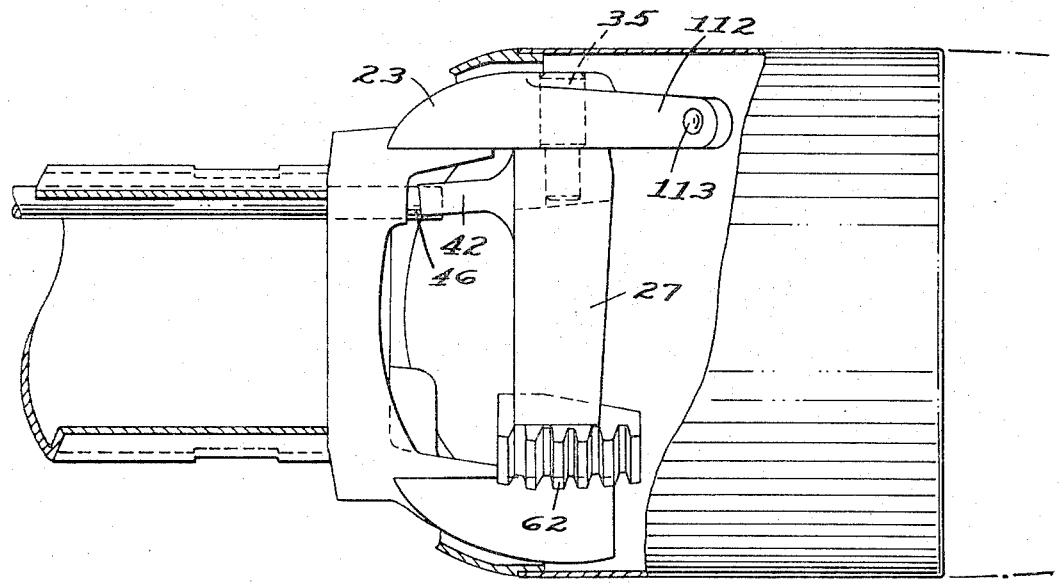
FIGURE 9 is a partial sectional view partially in elevation taken along the lines 9—9 of FIGURE 7.
Figure 7:
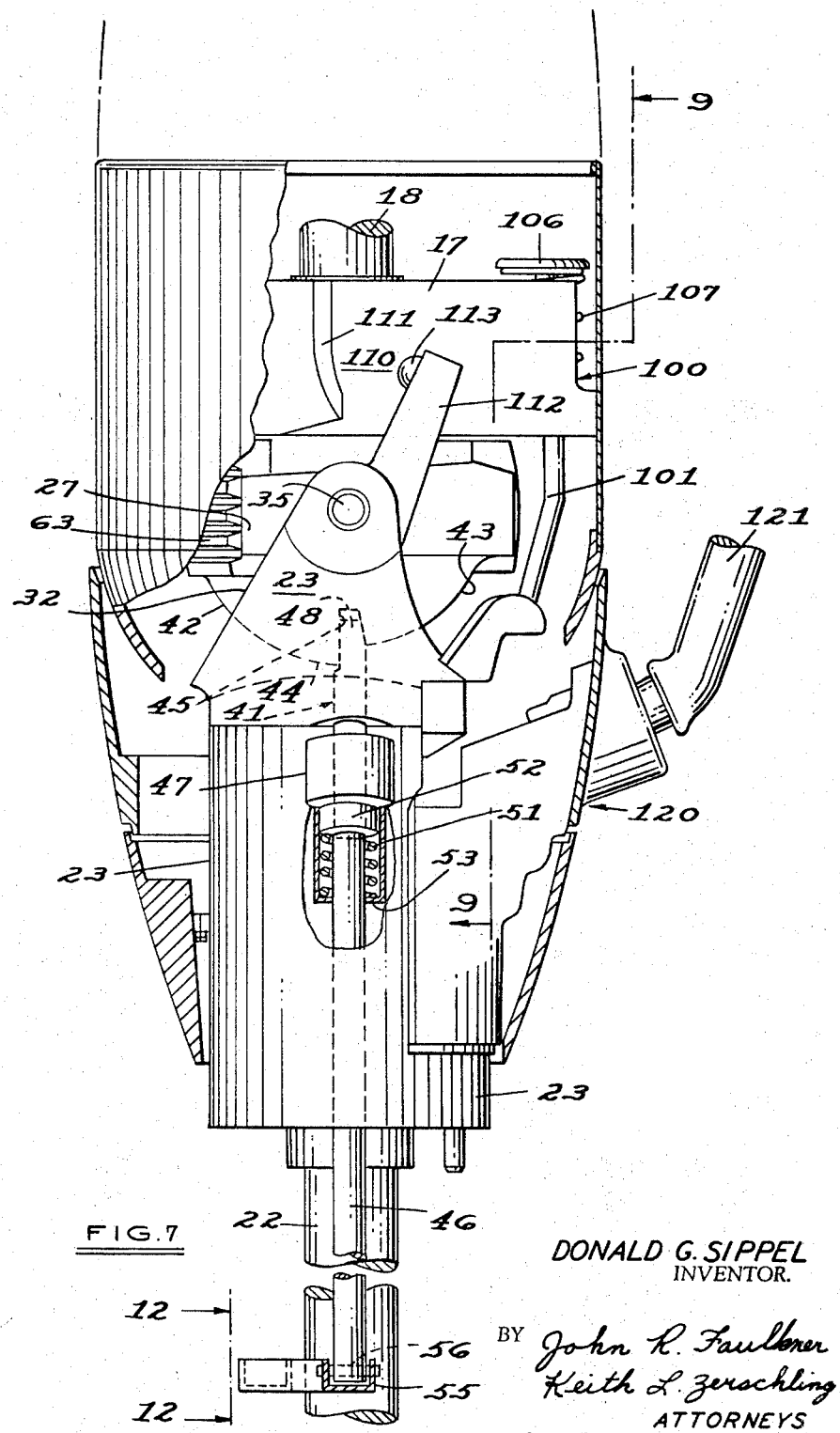
FIGURE 7 is a sectional view partially in elevation taken along the lines 7—7 and showing the releasable latching mechanism for releasably latching the intermediate ring or gimbal member to the fixed lower steering column section.

The intermediate ring or gimbal member 27 is releasably latched to the lower steering shaft section housing 23 of the lower steering column section 12 by means of a releasable latch mechanism generally designated by the numeral 41 and shown in FIGURES 7, 9 and 12. This releasable latch mechanism 41 comprises a depending portion 42 formed integrally with the intermediate ring or gimbal member 27 as shown in FIGURE 7 and this dependent portion 42 has a first arcuate section 43 of one radius and a second arcuate section 44 of a larger radius, with a slot 45 joining these sections. The lower steering shaft housing 23 carries an axially slidable pin or rod 46 that is slidable within a radial bearing member 47. The end of the pin or rod 46 designated by the numeral 48 is normally positioned in engagement with the slot 45 in the depending arcuate portion 42 of the intermediate ring or gimbal member 27 through the urging of a spring 51 that engages an enlarged portion 52 of the rod or pin member 46, and also engages a containing wall 53 formed in the lower steering shaft section housing member 23.

The other end of the pin or rod 46, opposite the end 48, is coupled to a lever 55, as shown at 56. The lever 55 is pinned at one end to a fixed portion 57 of the vehicle body, and has the other end affixed to an actuating link 58 as shown at 59 (see FIGURE 12). An axial force on the link 58 in a downward direction, as shown in FIGURE 12, will move the rod or pin 46 downwardly, as shown in relation to FIGURES 7 and 12, against the bias of the spring 51 thereby removing the end 48 from the slot 45 in the integrally formed depending portion 42 of the intermediate ring or gimbal member 27. The spring 51 will only permit sufficient travel for the end 48 to clear the arcuate section 43, but it cannot clear the arcuate section 44 of the member 42. Therefore, when the end 48 of rod 46 is removed from the slot 45 by the actuation of the lever 55 through the link 58, the end 48 of the pin 46 will ride on the arcuate section 43 and permit the upper steering column section 12 to be moved in a clockwise direction, as viewed in FIGURE 7, but the end 48 of the rod 46 will not permit movement of the steering column section 12 in a counterclockwise direction, since the end this time will be engagement with the arcuate section 44 of the arcuate portion 42 of the intermediate ring or gimbal member 27. Axial force on the actuating link 58 may be applied by any conventional mechanical or electrical device upon command of the vehicle operator.

A releasable multiple position latch mechanism, generally designated by the numeral 61 and best shown in FIGURES 3, 10, 8 and 11, releasably latches the upper steering column section 11 and the steering wheel 10 to the intermediate ring or gimbal member 27. This multiple position latch member comprises two sets of teeth 62 and 63 positioned in opposed relationship on the intermediate ring or gimbal member 27.

Figure 11:
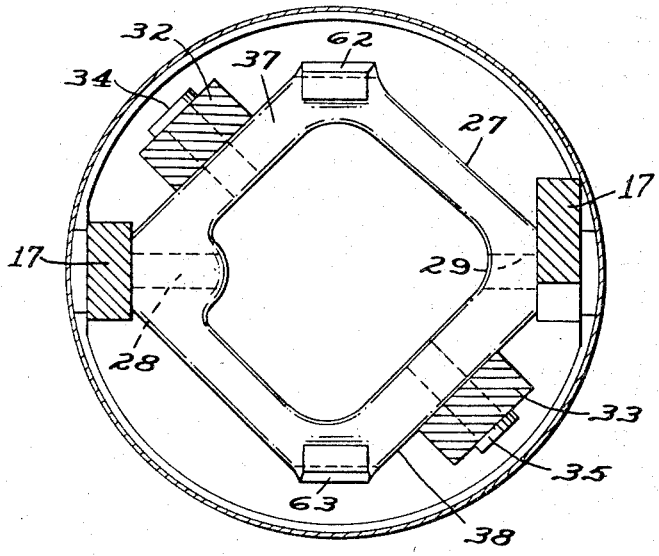
FIGURE 11 is a sectional view partially in elevation with the steering shaft omitted taken along the lines 11—11 of FIGURE 3.

As can best be seen by reference to FIGURE 11, the two sets of teeth 62 and 63 are positioned on the intermediate ring or gimbal member 27 at 90° angles with respect to the pivot pins 28 and 29 that pivotally mount the housing 17 of the upper steering column section 11 on the intermediate ring or gimbal member 27 and at 45° angles with respect to the pivot pins 34 and 35 that pivotally mount the intermediate ring or gimbal member 27 on the housing 23 of the lower steering column section 12. The faces of the teeth are generally disposed in planes parallel to the axis formed by the pivot pins 28 and 29.

Referring now to FIGURE 8, a pair of arms 64 and 65 are pivotally mounted on the housing 17 of the upper steering column section 11 by means of pivot pins 66 and 67. Each arm has a tooth 68 that matches the teeth 62 and 63 on the intermediate ring or gimbal member 27. The teeth 62 are alternately spaced with respect to the teeth 63 so that when the tooth 68 of the arm 64 is in engagement between the teeth 62, and the tooth 68 of arm 65 rests on top of one of the teeth of the teeth 63.

Spring means in the form of a first spring 71 and a second spring 72 are positioned within apertures in the housing 17 and engage the arms 64 and 65, respectively, on the opposite side of the pivot pins 66 and 65 from the teeth 68 to thereby urge the teeth 68 of the arms 64 and 65 into engagement with the teeth 62 and 63 on the intermediate ring or gimbal member 27.

In order to unlatch the teeth of the intermediate ring or gimbal member 27, either teeth 62 or 63, from the tooth 68 of either arm 64 or arm 65 it is necessary to move the arms 64 and 65 against the bias of the spring members 71 and 72. This is accomplished through a U-shaped actuating member 76 as can best be seen by reference to FIGURES 3, 4, 8 and 10. Referring now to FIGURE 4, it can be seen that the U-shaped actuating member 76 has an intermediate or middle portion 77 that is in engagement with turn signal lever 78. The end portions 81 and 82 of the U-shaped actuating member 76 are positioned for engagement with ramp-shaped portions 83 and 84 on the arms 64 and 65 of the multiple-position releasable latch member 61 (see FIGURE 8).

The U-shaped actuating member 76 is pivotally mounted in the housing 17 intermediate each end 81 and 82 and the intermediate or central portion 77 as shown at 84 and 85 of FIGURE 4 and the end portions 81 and 82 extend through slots 86 and 87 positioned in radially extending arms 88 and 89 in the housing 17 (see FIGURES 4 and 10).

The turn signal lever 78 has one end thereof mounted in a crosspin 91 in a cylindrical-shaped member 92 that in turn is pivotally mounted in the housing 17 by means of a pivot member 93 as can best be seen by reference to FIGURE 3. The cylindrical member 92 carries the conventional turn signal switch and cam cancelling means generally designated by the numeral 94 in FIGURE 4 so that when the turn signal lever 78 is rotated either clockwise or counterclockwise, as shown in FIGURE 4, it actuates the turn signal switch and positions the cam cancelling means in proper position to cancel the turn signal switches when the steering wheel is returned to a neutral position after the completion of a turn. This mechanism is entirely conventional and hence has not been further illustrated. The details of such a switching mechanism and cam cancelling system can be found in Patent No. 3,076,067, issued Jan. 29, 1963.

The crosspin 91 provides a bearing member in the cylindrical member 92 to permit the turn signal lever 78 to be actuated in a plane normal to its plane of operation as described in FIGURE 4 for actuation of the turn signals. As can best be seen by reference to FIGURES 3, 4 and 10 the intermediate portion 77 is positioned below and in engagement with the end of the turn signal lever 78 that is fixed to the crosspin member 91. Upon depression of the turn signal lever 78 in a plane perpendicular to the plane of operation of the turn signal lever when it operates the turn signal switch, the intermediate portion 77 of the U-shaped actuating member 76 is moved in this plane, depressed as it is viewed from the top in FIGURE 4 or moved to the left as viewed in FIGURES 3 and 10. This causes the end portions 81 and 82 to move upwardly as shown in FIGURE 4 or to the right as shown in FIGURE 8 as a result of the pivotal movement of the actuating member 76 about its pivotal points 84 and 85 in the housing member 17. This action forces the ends of the arms 64 and 65 inwardly by the action of the end portions 81 and 82 with the ramps 83 and 84 against the bias of springs 71 and 72, thereby disengaging the tooth 68 of either of the arms 64 or 65 from the teeth 62 or 63 of the intermediate ring or gimbal member 27 (see FIGURE 8). As a result, the housing 17 of the upper steering column section 11 is unlatched from the intermediate ring or gimbal member 27 and the housing 17, the upper steering column section 11, and the steering wheel 10 may be pivoted about the axis formed by the pins 28 and 29. As previously pointed out, this axis is transverse to the axis of the steering shafts 22 and 18 and lies in a substantially horizontal position, thereby permitting the movement of the steering wheel 10 into a plurality of different operable driving positions shown in FIGURES 1 and 2.

It is apparent from an inspection of FIGURE 8 that any one of a number of nine different driving positions may be selected, and when a proper position is reached, the operator only need release the turn signal lever 78 and either the tooth 68 on the arm 64 or the tooth 68 on the arm 65 will then be forced into engagement with the teeth 62 or the teeth 63 on gimbal member 27 through the action of springs 71 and 72 to relocate and latch the steering wheel 10 in any selected operable driving position.

A single spring means shown in FIGURES 4 through 7 and generally designated by the numeral 100 is employed to move the steering wheel 10 and upper steering column section 11 to the swingaway position when the releasable latch means 41 is actuated to release the intermediate ring or gimbal member 27 from the housing 23 of the lower steering column section 12. As previously pointed out this permits movement of the intermediate ring or gimbal member 27, the steering wheel 10 and the upper steering column section 11 about the axis defined by the pivot pins 34 and 35. This same spring means is also employed to urge the upper steering column section 11 and the steering wheel 10 into the uppermost operable driving position when the releasable latch means 61 is released by operation of the turn signal lever 78. As previously pointed out, this permits pivotal movement of these components about the substantially horizontal axis defined by the pins 28 and 29 that pivotally mount the housing 17 of the upper steering column section 11 on the intermediate ring or gimbal member 27. This single spring means comprises a rod 101 having a hooked end 102 that engages a complementary hooked portion 103 on the lower steering column housing 23. The other end 105 of the rod 101 carries a cap 106 that engages one end of spring 107. The other end of spring 107 is seated in and engages housing 17 of the upper steering column section 11 as best shown at 108.

Referring now to FIGURE 4, it can be seen that this rod 101 and the cap member 106 are positioned approximately 90° in a circumferential direction from the swingaway axis defined by the pivot pins 34 and 35 as seen in FIGURE 11. The spring 107 thus applies a direct force approximately mid-way between these two pivot pins and normal to the swingaway axis defined by them for moving the steering wheel 10 and upper steering column section 11 into the swingaway position when the releasable latch mechanism 41 is released. Furthermore, it also provides a force to urge the steering wheel 10 and upper steering column section 11 into the uppermost operable driving position when the releasable latch mechanism 61 is released to thereby permit pivotal movement of the steering wheel 10 and upper steering column section 11 about the substantially horizontal axis defined by the pivot pins 28 and 29.

Figure 6:
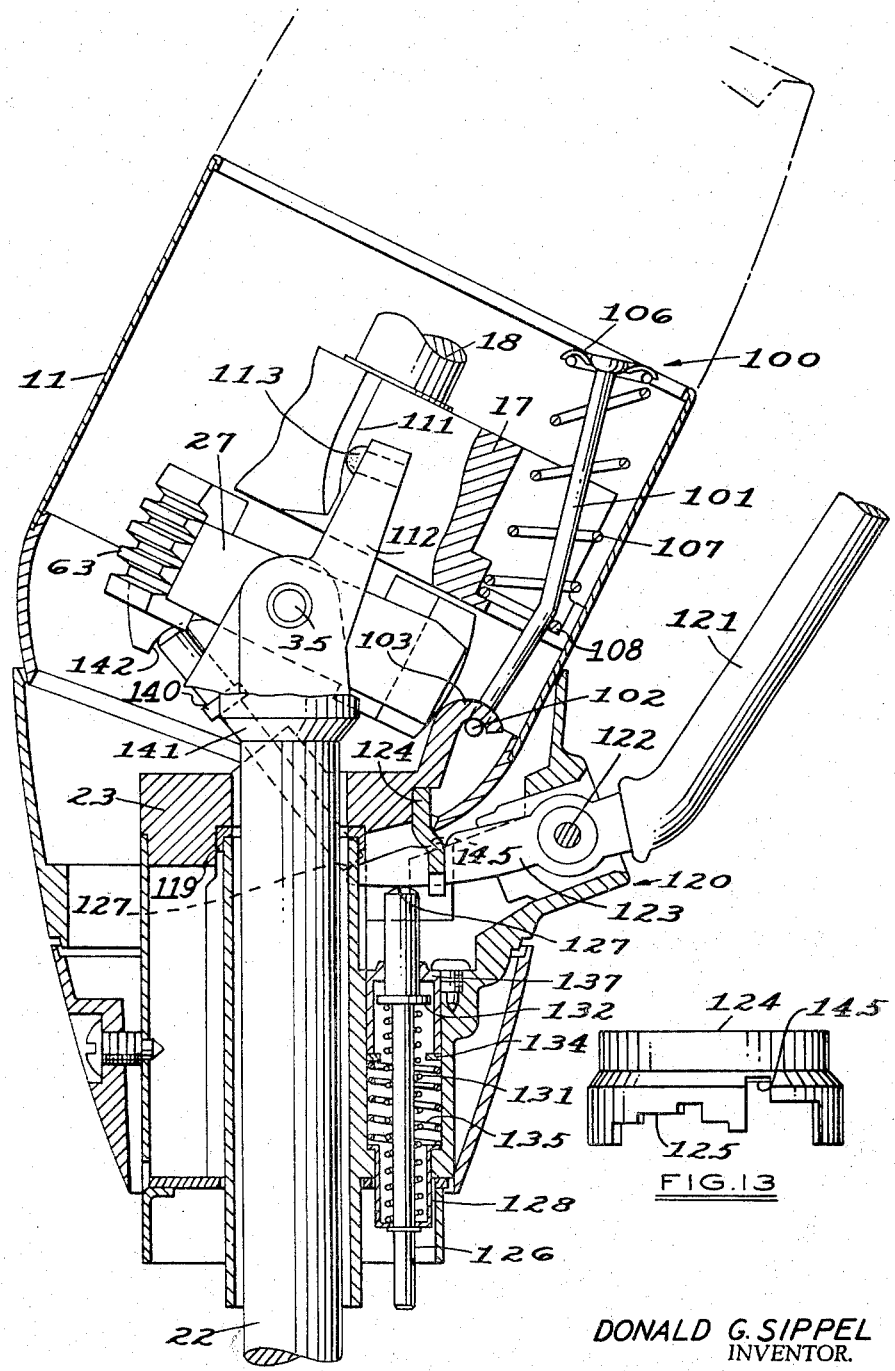
FIGURE 6 is a sectional view partially in elevation taken along the lines 6—6 (the same lines as the view of FIGURE 5) but showing the upper steering column section positioned in its swing away position.

FIGURE 6 shows the action of spring means 100 when the releasable latch mechanism 41 is released. The spring expands and urges the upper housing section 17, the upper steering column section 11, and steering wheel 10 into the swingaway position as shown in FIGURE 6. It should be realized that FIGURE 6 is a view taken along a line which is substantially normal to the swingaway axis defined by pivot pins 34 and 35.

Figure 5:
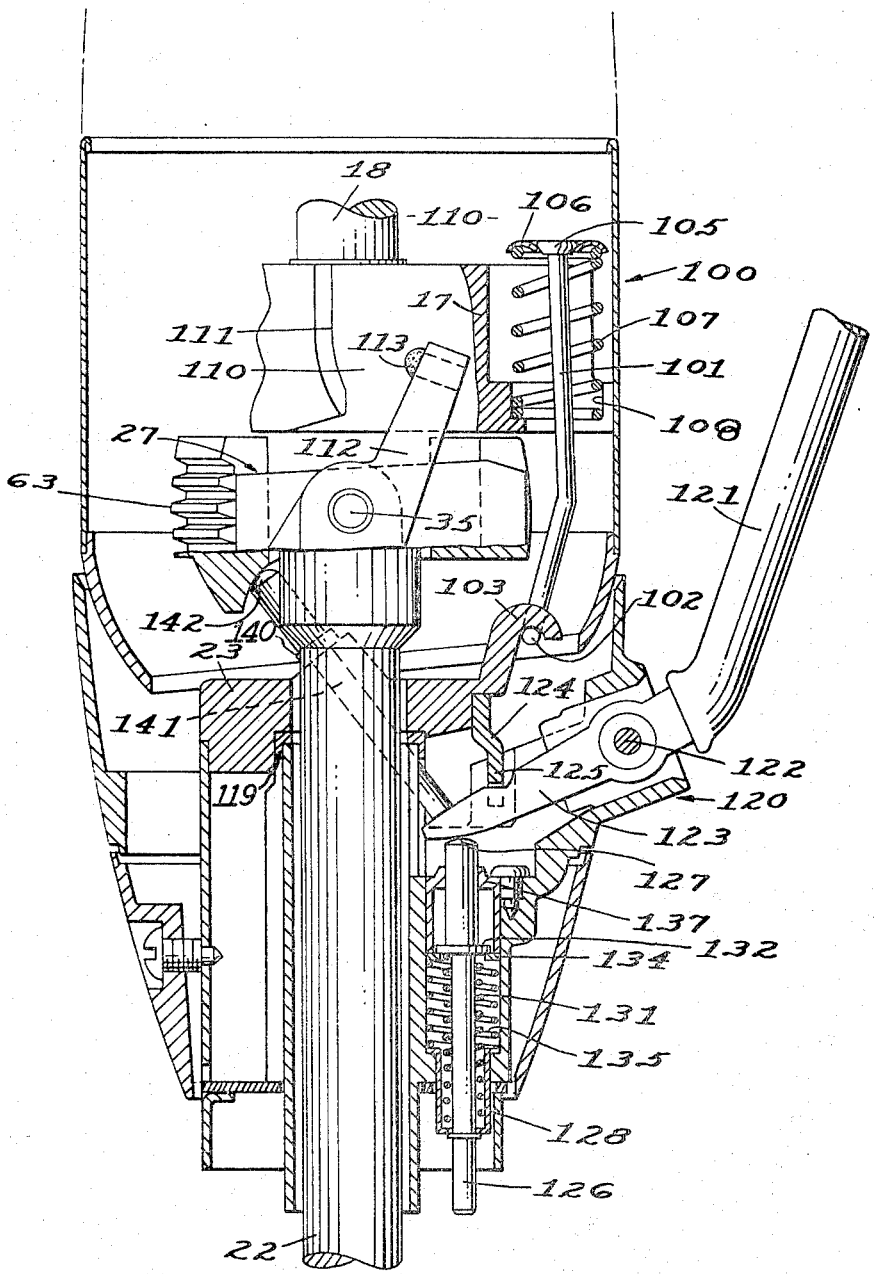
FIGURE 5 is a sectional view partially in elevation taken along the lines 5—5 of FIGURE 4, and showing the steering column in one of its operable driving positions.

Referring now to FIGURES 5, 6 and 7 there is shown a stop mechanism generally designated by the numeral 110 that provides a means for bringing the steering wheel 10 and the upper steering column section 11 to rest against the action of the single spring means 100 when the releasable latch mechanism 41 is released and the steering wheel 10 and upper steering column section 11 are moved to the swingaway position. This stop mechanism 110 includes means for limiting the movement of the steering wheel 10 and the upper steering column section 11 to the same position within the vehicle body and in the same position with respect to the instrument panel shown in FIGURES 1 and 2 as these components are moved to the swingaway position irrespective of the operable driving position of the steering wheel 10 as a result of the adjustment about the horizontal axis defined by the pivot pins 28 and 29. This is accomplished by means of a cam surface 111 on the housing 17 of the upper steering column section 11 that is formed generally in a plane that is parallel to the swingaway axis defined by the pivot pins 34 and 35. The housing 23 of the lower steering column section 12 includes an upstanding arm 112 having a follower button 113 positioned at the end thereof.

It can be seen by reference to FIGURE 6 that when the releasable latch mechanism 41 is released and the steering wheel 10 and the upper steering column section 11 swing about the swingaway axis, the cam surface 111 will move into engagement with the stop button 113 thereby limiting the movement of the steering wheel 10 and the upper steering column section 11 in the swingaway direction. It can also be appreciated from an inspection of FIGURES 5 and 6 that if the steering wheel 10 and the upper steering column section 11 are moved into one of the upper operable driving positions as a result of pivotal movement about the substantially horizontal tilt axis defined by pivot pins 28 and 29, that the cam surface 111 would move closer to the stop button 113 on the arm 112. This would occur should the steering wheel 10 and upper steering column section 11 be moved, for example, into the position 13 as shown in FIGURE 2. As shown in FIGURES 5 and 6, steering wheel 10 and the upper steering column section 11 are positioned in the mid-position as shown in the solid lines in FIGURE 2.

On the other hand, should the steering wheel 10 and the upper steering column section 11 be positioned in one of its lower operable driving positions as indicated by the numeral 14 in FIGURE 2, the cam surface 111 would be moved away from the stop button 113 on the arm 112. The cam surface 111, therefore, is generated so that the steering wheel 10 and upper steering column section 11 will come to rest, when they are moved into the swingaway position, at the same place in relation to the instrument panel in the vehicle irrespective of the operable driving position of the steering wheel 10.

In certain applications of the invention it may be necessary to move or swing transmission selector lever 121 with the steering wheel 10 and the upper steering column section 11 in order to avoid interference as the steering wheel 10 and upper steering column section 11 are moved into the swingaway position as shown by the dotted lines in FIGURE 1, since the selector lever 121 may be in the path of movement of these components as they are moved to the swingaway position. The mechanism for accomplishing this purpose is shown in FIGURES 5 and 6. The transmission selector 121 as shown is pivotally mounted on a pin 122 for movement in a clockwise direction as viewed in these figures. The pin 122 is supported in a cylindrical transmission selector housing 120 that is in turn supported for pivotal movement in the lower housing 23 about the axis of the lower steering shaft section 22 by means of bearings, one of which is shown at 119. This is conventional in the mounting of these selector levers to permit the locking of the lever in various positions including "Park" position. To provide this feature, the end 123 of the transmission selector lever 121 positioned within transmission selector housing 120 registers with an arcuate stepped or slotted member 124 carried by the lower steering column housing 23 as the transmission selector housing is pivotally moved about the axis of the lower steering shaft section 22 to select different transmission gear ratios.

As shown in FIGURE 5, the transmission selector lever 121 and transmission selector housing 120 are positioned in other than the "Park" position, and it can be seen that the end 123 is positioned in engagement with a stepped portion 125 on the member 124. A spring urged rod member 126 engages the end 123 of transmission selector rod 121 as at 127 to urge the transmission selector lever end 123 into engagement with the stepped portion 125. This is accomplished by a two-step spring arrangement comprising a lower cup 128 mounted in the housing 120 that houses a first helical spring 131. The end of this spring engages a radially extending flange 132 on the rod 12. This flange 132 also engages a washer 134 that in turn is in engagement with a second helical spring 135 that bottoms on an enlarged flange of the cup 128. A second cup member 137 provides a means for guiding the rod 126 into engagement with the end of the transmission selector lever 123.

Another rod or pin 141 is slidably mounted in the lower housing 23 and has one end engaging a cam surface 142 carried or formed integrally with the intermediate ring or gimbal member 27. The rod or pin 141 has an enlarged shoulder 140 that engages the lower housing 23 as shown in FIGURE 5 to limit the movement of said rod or pin downwardly and to the right as viewed in FIGURE 5. As previously stated, FIGURE 5 shows the transmission selector housing in other than the "Park" position and in this position the end 123 is not in registration with the end of rod or pin 141 opposite the end 142. It can be appreciated that in FIGURE 5 the steering mechanism of the present invention is shown in one of its operative driving positions, and as previously mentioned this is the middle operative driving position as shown in the solid lines in FIGURE 2.

When the transmission selector housing 120 and lever 121 are moved into the "Park" position, the end 123 of the transmission selector lever 121 will move into registration with another and deeper step 145 on the stepped arcuate member 124 and into registration with the end of the rod or pin 141 opposite the end 142. At this time the rod or pin 141 will prevent clockwise movement of end 123 of the transmission selector lever about the pivot pin 122 since the end 142 of the pin or rod is in engagement with the cam surface 142 which is still in the position shown in FIGURE 5. When the releasable latch mechanism 41 is released to permit pivotal movement about the swingaway axis defined by the pins 34 and 35 into the swingaway position, the cam surface 142 formed on the intermediate ring or gimbal member will be pivoted upwardly and outwardly as shown in FIGURE 6 in relation to the pin or rod 141. This permits upward and outward movement of the rod 141 against the cam surface 142 thereby permitting the spring-urged rod 126 to force the end 123 of the transmission selector lever 121 upwardly as shown in FIGURE 6. This in turn moves the outer end of the transmission selector lever 121, on the opposite side of the pivot pin 122 from the end 123, in a clockwise direction as shown in FIGURE 6 and with the steering wheel 10 and the upper steering column section 11 as these components move to the swingaway position thereby preventing any interference between the transmission selector lever 121 and the upper steering column section 11 when this section is moved to the swingaway position.

When the upper steering column section 11 and steering wheel 10 are moved back from the swingaway position into an operable driving position, the rod 141 by following the cam surface 142 on the intermediate ring or gimbal member 27 forces selector lever 121 back into the position shown in FIGURE 5 against the bias of the spring-urged rod 126. The dual spring arrangement defined by the two springs 131 and 135 permits this action. The first spring 131 is operable for moving the transmission selector lever 121 into the position shown in FIGURE 6 when the steering wheel 10 and the upper steering column section 11 are moved into the swingaway position and the second spring 135 is employed to permit feel and detent operation of the transmission selector lever 121 as it is moved into its various gear selecting positions as defined by the various stepped portions and the arcuate stepped member 124 shown in FIGURE 13.

The present invention thus provides a steering mechanism in which a steering wheel may be moved into a plurality of different operable driving positions about an axis which is substantially horizontal and which is disposed transversely with respect to the axis of the steering column and the steering shaft. Furthermore, it permits movement into a swingaway position about an axis offset with respect to the horizontal and disposed transversely to the axis of the steering shaft and the steering column. This axis is preferably disposed at a 45° angle with respect to the horizontal axis thereby permitting movement of the steering wheel and upper steering column section into a position upwardly and inwardly in the vehicle with respect to any operable driving position. This arrangement permits the driver or operator of the vehicle to adjust the steering wheel into any one of a number of different operable driving positions that most correctly suits his physical characteristics. It also permits him to move the steering wheel and upper steering column section into a remote or displaced position inwardly and preferably upwardly in the vehicle to provide easy egress from and access to the driver's seat of the vehicle. This arrangement also has an automatic or inherent memory in that, as previously described, the steering wheel when being returned from the swingaway position will automatically return to the previously selected driving position.

The invention also provides for a unique means for operating the multiple position releasable latch mechanism that latches the steering wheel and upper steering column section into any one of a number of driving positions, and it also provides a means for positioning the steering wheel and steering column in the identical swingaway position irrespective of the operable driving position in which the steering wheel is located when it is swung away to this position. Furthermore, means are provided in the invention for shifting or moving the transmission selector lever with the upper steering column section and steering wheel as the upper steering column section and steering wheel are moved into the swingaway position, thereby preventing any interference between the transmission shift lever and the upper steering column section and steering wheel.

It is to be understood that this invention is not to be limited to the exact construction shown and described, but that various changes and modifications may be made without departing from the spirit and scope of the invention as defined in the appended claims.

I claim:

1. In an automotive vehicle, an adjustable steering wheel assembly mounted in said vehicle body and comprising, a fixed lower column section and a movable upper column section, a lower steering shaft rotatably mounted in said lower column section, an upper steering shaft rotatably mounted in said upper column section, a steering wheel connected to said upper steering shaft, a universal joint connecting said lower steering shaft and said upper steering shaft, means coupling said upper and lower steering column sections for permitting adjustment of said upper steering column and said steering wheel into a plurality of operable driving positions located in a plane defined by said lower fixed column and said upper column section when said upper column section is positioned in any one of said plurality of operable driving positions and for permitting said upper column section and said steering wheel to be displaced into a swingaway position in a plane that extends upwardly and inwardly in the vehicle body in relation to said first mentioned plane, and cooperating stop means formed in said fixed lower column section and said movable upper column section for limiting the movement of said upper column section and said steering wheel to the same swingaway position irrespective of the operable driving position in which said upper column section and steering wheel are located when said upper column section and said steering wheel are displaced toward said swingaway position.

2. The combination of claim 1 in which said cooperating stop means comprises a cam surface formed in said movable upper column section and a follower carried in said fixed lower column section and is positioned in the path of said cam surface as said movable upper column section and said steering wheel are moved toward the swingaway position.

3. An adjustable steering mechanism for an automotive vehicle comprising, an upper steering shaft section, a lower steering shaft section, a steering wheel connected to said upper steering shaft section, a universal joint coupling said upper steering shaft section and said lower steering shaft section, an upper housing rotatably supporting said upper steering shaft section, a lower housing rotatably supporting said lower steering shaft section, an intermediate gimbal member, means pivotally mounting said upper housing on said intermediate gimbal member about a substantially horizontal tilt axis passing through the center of said universal joint and disposed substantially transversely with respect to the axis of said lower steering shaft section for movement of said upper housing and said steering wheel into any one of a plurality of operable driving positions, and means pivotally mounting said intermediate gimbal member on said lower housing on a swingaway axis passing through the center of said universal joint and disposed substantially transversely with respect to the axis of said lower steering shaft section, said swingaway axis being disposed at a substantial acute angle with respect to said tilt axis and with the inner end thereof being positioned below said tilt axis and with the outer end being positioned above said tilt axis whereby said upper housing and said steering wheel may be moved about said swingaway axis into a swingaway position located upwardly and inwardly in the vehicle with respect to any of said operable driving positions, and cooperating stop means formed in said lower housing and said upper housing for limiting the movement of said upper housing and said steering wheel to the same swingaway position irrespective of the operable driving position in which said upper housing and steering wheel are located when said upper housing and steering wheel are moved toward said swingaway position.

4. The combination of claim 3 in which said cooperating stop means comprises, a cam surface formed in said upper housing that is substantially parallel to said swingaway axis and a follower carried by said lower housing and positioned in the path of said cam surface as said upper housing and steering wheel are moved toward the swingaway position.

5. In an automotive vehicle, a vehicle body, an adjustable steering wheel assembly mounted in said vehicle body and comprising, a fixed lower column section and a movable upper column section, a lower steering shaft rotatably mounted in said lower column section, an upper steering shaft rotatably mounted in said upper column section, a steering wheel connected to said upper steering shaft, a universal joint connecting said lower steering shaft and said upper steering shaft, means coupling said upper and lower steering column sections for permitting adjustment of said upper steering column and said steering wheel into a plurality of upper and lower operable driving positions located in a plane defined by said lower fixed column and said upper column section when said upper column section is positioned in any one of said plurality of operable driving positions and for permitting said upper column section to be displaced into a swingaway portion in a plane that extends upwardly and inwardly in the vehicle body in relation to said first mentioned plane, and single spring means coupling said lower column section and said upper column section for urging said steering column and said steering wheel into the uppermost operable driving position and for urging said upper column section and said steering wheel into said swingaway position.

6. In an automotive vehicle, a vehicle body, an adjustable steering wheel assembly mounted in said vehicle body and comprising, a fixed lower column section and a movable upper column section, a lower steering shaft rotatably mounted in said lower column section, an upper steering shaft rotatably mounted in said upper column section, a steering wheel connected to said upper steering shaft, a universal joint connecting said lower steering shaft and said upper steering shaft, means coupling said upper and lower steering column sections for permitting adjustment of said upper steering column and said steering wheel into a plurality of operable driving positions located in a plane defined by said lower fixed column and said upper column section when said upper column section is positioned in any one of said plurality of operable driving positions and for permitting said upper column section to be displaced into a swingaway position in a plane that extends upwardly and inwardly in the vehicle body in relation to said first mentioned plane, single spring means coupling said lower column section and said upper column section for urging said steering column and said steering wheel into the uppermost operable driving position and for urging said upper column section and said steering wheel into said swingaway position, and cooperating stop means formed in said fixed lower column section and said movable upper column section for limiting the movement of said upper column section and said steering wheel to the same swingaway position irrespective of the operable driving position in which said upper column section and steering wheel are located when said upper column section and said steering wheel are displaced toward said swingaway position.

7. An adjustable steering mechanism for an automotive vehicle comprising, an upper steering shaft section, a lower steering shaft section, a steering wheel connected to said upper steering shaft section, a universal joint coupling said upper steering shaft section and said lower steering shaft section, an upper housing rotatably supporting said upper steering shaft section, a lower housing rotatably supporting said lower steering shaft section, an intermediate gimbal member, means pivotally mounting said upper housing on said intermediate gimbal member about a substantially horizontal tilt axis passing through the center of said universal joint and disposed substantially transversely with respect to the axis of said lower steering shaft section for movement of said upper housing and said steering wheel into any one of a plurality of operable driving positions, means pivotally mounting said intermediate gimbal member on said lower housing on a swingaway axis passing through the center of said universal joint and disposed substantially transversely with respect to the axis of said lower steering shaft section, said swingaway axis being disposed at a substantial acute angle with respect to said tilt axis and with the inner end thereof being positioned below said tilt axis and with the outer end being positioned above said tilt axis, whereby said upper housing and said steering wheel may be moved about said swingaway axis into a swingaway position located upwardly and inwardly in the vehicle with respect to any of said operable driving positions, and a single spring means coupling said upper housing and said lower housing and acting on a line positioned upwardly and inwardly in the vehicle body with respect to both said tilt axis and said swingaway axis for urging said upper housing and said steering wheel into said swingaway position and for urging said upper housing and said steering wheel into the uppermost driving position.

8. An adjustable steering mechanism for an automotive vehicle comprising, an upper steering shaft section, a lower steering shaft section, a steering wheel connected to said upper steering shaft section, a universal joint coupling said upper steering shaft section and said lower steering shaft section, an upper housing rotatably supporting said upper steering shaft section, a lower housing rotatably supporting said lower steering shaft section, an intermediate gimbal member, means pivotally mounting said upper housing on said intermediate gimbal member about a substantially horizontal tilt axis passing through the center of said universal joint and disposed substantially transversely with respect to the axis of said lower steering shaft section for movement of said upper housing and said steering wheel into any one of a plurality of operable driving positions, means pivotally mounting said intermediate gimbal member on said lower housing on a swingaway axis passing through the center of said universal joint and disposed substantially transversely with respect to the axis of said lower steering shaft section, said swingaway axis being disposed at a substantial acute angle with respect to said tilt axis and with the inner end thereof being positioned below said tilt axis and with the outer end being positioned above said tilt axis, whereby said upper housing and said steering wheel may be moved about said swingaway axis into a swingaway position located upwardly and inwardly in the vehicle with respect to any of said operable driving positions, a single spring means coupling said upper housing and said lower housing and acting on a line positioned upwardly and inwardly in the vehicle body with respect to both said tilt axis and said swingaway axis for automatically urging said upper housing and said steering wheel into said swingaway position and for urging said upper housing and said steering wheel into the uppermost driving position, and cooperating stop means formed in said lower housing and said upper housing for limiting the movement of said upper housing and said steering wheel to the same swingaway position irrespective of the operable driving position in which said upper housing and steering wheel are located when said upper housing and steering wheel are moved toward said swingaway position.

9. An adjustable steering mechanism for an automotive vehicle comprising, an upper steering shaft section, a lower steering shaft section, a steering wheel connected to said upper steering shaft section, a universal joint coupling said upper steering shaft section and said lower steering shaft section, an upper housing rotatably supporting said upper steering shaft section, a lower housing rotatably supporting said lower steering shaft section, an intermediate gimbal member, means pivotally mounting said upper housing on said intermediate gimbal member about a substantially horizontal tilt axis passing through the center of said universal joint and disposed substantially transversely with respect to the axis of said lower steering shaft section, a releasable latch means releasably latching said upper housing to said intermediate gimbal member for permitting said upper housing, said upper steering shaft section and said steering wheel to be adjustably positioned into differently positioned operable driving positions about said tilt axis, means pivotally mounting said intermediate gimbal member on said lower housing on a swingaway axis passing through the center of said universal joint and disposed substantially transversely with respect to the axis of said lower steering shaft section, said swingaway axis being disposed at a substantial acute angle with respect to the tilt axis and with the inner end thereof being positioned below said tilt axis and with the outer end thereof being positioned above said tilt axis, a releasable latch means interconnecting said lower housing with said intermediate ring member for permitting said intermediate gimbal member, said upper housing, said upper steering shaft section and said steering wheel to be swung away to a position upwardly and inwardly in the automotive vehicle with respect to said operable driving positions when said last mentioned releasable latch means is released, a single spring means coupled to said upper housing and said lower housing and having a line of action positioned upwardly and inwardly in the vehicle body with respect to both said tilt axis and said swingaway axis for automatically moving said intermediate gimbal member, said upper housing, said upper steering shaft section and said steering wheel into the swingaway position when said releasable latch means that couples said lower housing and said intermediate gimbal member is released and for urging said upper housing, said upper steering shaft section and said steering wheel into the uppermost driving position when said releasable latch means that couples said upper housing and said intermediate gimbal member is released.

10. The combination of claim 9 in which said lower housing has an upwardly extending arm positioned thereon and said upwardly extending arm has a stop button positioned at the end thereof remote from said lower housing and in which said upper housing has a cam surface lying in a plane substantially parallel to said swingaway axis and adjacent said stop button, said cam surface being generated and shaped to limit the swingaway movement of said intermediate gimbal member, said upper housing, said upper steering shaft section and said steering wheel to the identical swingaway position when said releasable latch means intercoupling said lower housing and said intermediate gimbal member is released and said intermediate gimbal member, said upper housing, said upper steering shaft section and said steering wheel are swung away toward the swingaway position irrespective of the operable driving position in which said upper housing, said upper steering shaft section and said steering wheel are located.

11. A steering mechanism for an automotive vehicle having a driver's seat, an adjustable steering mechanism positioned adjacent the driver's seat to enable the driver of the vehicle to operate said adjustable steering mechanism, said adjustable steering mechanism comprising, a fixed lower housing, a lower steering shaft section rotatably mounted in said fixed lower housing, an upper housing, an upper steering shaft section rotatably mounted in said upper housing, a steering wheel connected to said upper steering shaft section, a universal joint coupling said upper steering shaft section and said lower steering shaft section, means coupling said upper housing and said lower housing for permitting angular adjustment of said upper housing, said upper shaft and said steering wheel about a substantially horizontal axis passing through the center of said universal joint and disposed substantially transversely with respect to the axis of said lower steering shaft section into a plurality of different operable driving positions, means coupling said upper housing and said lower housing for permitting said upper housing, said upper steering shaft section and said steering wheel to be swung away to a swingaway position located upwardly and inwardly in the vehicle body from any of said different operable driving positions about an axis passing through the center of said universal joint and positioned transversely with respect to the axis of said lower steering shaft section at an angle to said substantially horizontal axis thereby facilitating easy egress from and access to said driver's seat, and a single spring means disposed generally parallel to the axis of said lower steering shaft section and coupling said upper housing and said lower housing in a position for urging said upper housing, said upper steering shaft section and said steering wheel to the swingaway position and for urging said upper housing, said steering shaft section and said steering wheel into the uppermost operable driving position.

12. A steering mechanism for an automotive vehicle having a driver's seat, an adjustable steering mechanism positioned adjacent the driver's seat to enable the driver of the vehicle to operate said adjustable steering mechanism, said adjustable steering mechanism comprising, a fixed lower housing, a lower steering shaft section rotatably mounted in said fixed lower housing, an upper housing, an upper steering shaft section rotatably mounted in said upper housing, a steering wheel connected to said upper steering shaft section, a universal joint coupling said upper steering shaft section and said lower steering shaft section, means coupling said upper housing and said lower housing for permitting angular adjustment of said upper housing, said upper shaft and said steering wheel about a substantially horizontal axis passing through the center of said universal joint and disposed substantially transversely with respect to the axis of said lower steering shaft section into a plurality of different operable driving positions, means coupling said upper housing and said lower housing for permitting said upper housing, said upper steering shaft section and said steering wheel to be swung away to a swingaway position located upwardly and inwardly in the vehicle body from any of said different operable driving positions about an axis passing through the center of said universal joint and positioned transversely with respect to the axis of said lower steering shaft section at an angle to said substantially horizontal and cooperating stop means formed on said fixed lower housing and said upper housing for limiting the movement of said upper housing, said upper steering shaft section and said steering wheel to the identical swingaway position irrespective of the operable driving position in which said upper housing, said upper steering shaft section and said steering wheel are located when said upper housing, said upper steering shaft section and said steering wheel are swung towards the swingaway position.

References Cited

UNITED STATES PATENTS

| | | | |
|---|---|---|---|
| 3,368,421 | 2/1968 | Hass et al. | 74—493 |
| 3,144,785 | 8/1964 | Steiner et al. | 74—493 |
| 3,167,971 | 2/1965 | Zeigler et al. | 74—493 |
| 3,302,478 | 2/1967 | Pauwels | 74—493 |

MILTON KAUFMAN, *Primary Examiner.*

U.S. Cl. X.R.

180—78